Dec. 6, 1932.  D. L. SHATTO ET AL  1,890,166
MIRROR CONSTRUCTION
Filed April 5, 1930
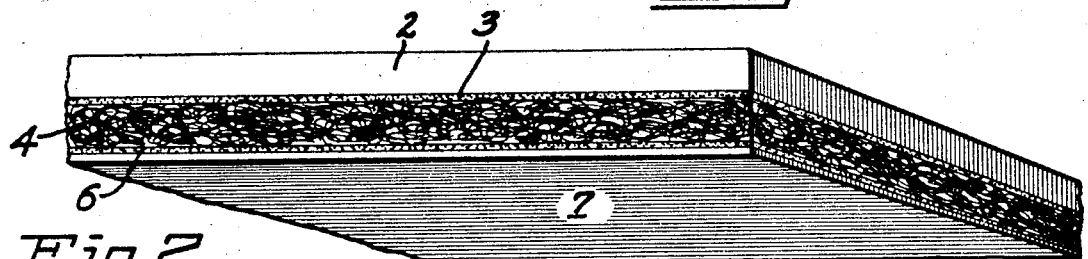
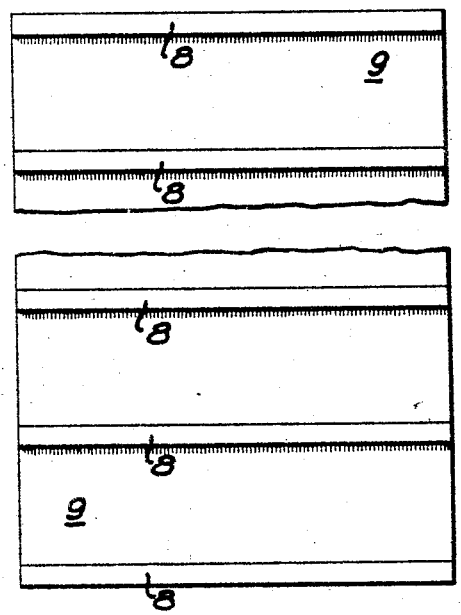
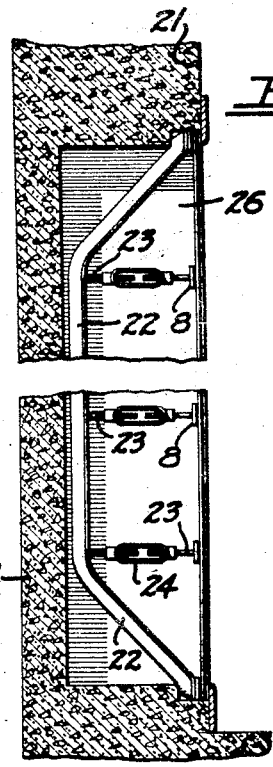
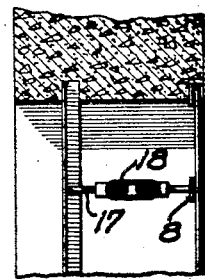
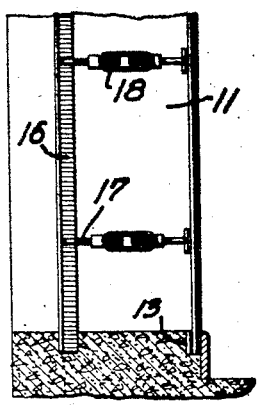
INVENTORS
DAVID L. SHATTO
FRANK FLOYD LINDSTAEDT
BY Charles A. Evans
THEIR ATTORNEY Patented Dec. 6, 1932

1,890,166

UNITED STATES PATENT OFFICE

DAVID L. SHATTO, OF BERKELEY, AND FRANK FLOYD LINDSTAEDT, OF OAKLAND, CALIFORNIA, ASSIGNORS TO HERCULES GLUE COMPANY, OF SAN FRANCISCO, CALIFORNIA, A CORPORATION OF CALIFORNIA

MIRROR CONSTRUCTION

Application filed April 5, 1930. Serial No. 441,824.

Our invention relates to a beam structure including sheet glass, and the primary object of our invention is the provision of reinforcing means for a mirror to prevent bowing thereof, and consequent distortion of the image.

Another object of our invention is the provision of such reinforcing means, which will allow the use of glass of less thickness than necessary if the reinforcing means were not used, thereby effecting an economy in the cost of the glass.

The invention possesses numerous other objects and features of advantage, some of which, with the foregoing, will be set forth in the following description of our invention. It is to be understood that we do not limit ourselves to this disclosure of species of our invention, as we may adopt variant embodiments thereof within the scope of the claims.

Referring to the drawing:

Figure 1 is a perspective view illustrating a corner portion of the mirror construction of our invention.

Figure 2 is a plan view of the underside of our mirror construction; illustrating a modified construction. A portion of the structure is omitted to shorten the view.

Figures 3 and 4 are elevational views illustrating methods of mounting our mirror construction. Portions of the structures are shown in section, and portions are omitted from the view clearly to disclose the construction.

In the present installation of mirrors for display or similar purposes, or for the purposes of effecting optical illusions, these mirrors are usually of large heavy sheets of plate glass supported in upright position. The weight of the glass of such mirrors is considerable. Consequently the mirrors will sag or bow of their own weight, thereby giving a distorted image. The usual stock size plate glass comes in thickness not greater than ¼ inch; which thickness of glass will bow considerable due to the weight of glass.

We have found, by experiment, that if sheets of plate glass two inches wide and ¼ of an inch thick, are each supported on knife edges spaced 23 inches apart and each subjected to a 5 lb. weight placed midway between the knife edges, the average deflection is about .04 of an inch or 40 mills.

Due to the great degree of bowing of ¼ inch glass, it is preferable to employ thicker glass to obviate distortion, where the glass is used as a large mirror. Generally, plate glass ¾ of an inch in thickness is employed. It is apparent that the cost of glass of such thickness is considerably greater than ¼ inch glass. Furthermore, ¾ inch glass does not generally come in stock size; hence special orders must usually be placed for such size, increasing the cost and effecting delay in securing the desired thickness of glass.

Our invention is designed to obviate the above difficulties; so as to permit the use of comparatively thin plate glass, in a mirror construction. Broadly, the invention comprises securing, to the glass mirror, a backing plate of greater tensile strength than the mirror; so as to take up the tensional stresses which normally sheet glass is subjected to, by its own weight. Preferably spacing means is interposed between the backing plate and glass sheet to provide a beam construction; the spacing means performing the important function of bringing the neutral axis of the beam away from the normal neutral axis of the plate glass, so as to lessen tensional stresses in the glass.

In greater detail and with reference to Figure 1, we employ plate glass 2 preferably ¼ inch in thickness, which is finished, according to usual practice, on one surface thereof to provide a mirror. To the finished surface of the glass is secured, by a coating 3 of any suitable adhesive, a spacing sheet 4. Any suitable material may be used as the spacing sheet, but we preferably employ fibreboard, ¼ inch in thickness, due to its lightness and the ease with which such material may be glued to the glass. For the fibreboard, any of the various composition building boards on the market may be used instead.

On the underside of fibreboard is secured by means of any suitable adhesive, forming an adhesive coating 6, the backing sheet 7 of greater tensile strength than the glass. Preferably, comparatively thin sheet metal is employed as the backing plate. We have found 16 gauge sheet iron satisfactory.

By experiment, we have found that the average deflection caused by a 5 lb. weight, placed on the glass surface of the mirror construction described and under the conditions previously set forth in connection with our experiments on ¼ inch plate glass alone, is only .004 of an inch, or 4 mills, in comparison to the 40 mill deflection of the plate glass alone. This deflection is approximately equal to the deflection of ¾ inch thick plate glass, under the experimental conditions described. It is hence apparent, that our mirror construction will permit the mirror to reflect as clear an image as the ¾ inch plate glass. Furthermore, the weight per square foot of the described construction is approximately 3 lbs. less than that of the ¾ inch plate glass.

In the construction described, the neutral axis of the beam formed is without the body of the glass sheet; thereby relieving the glass of tensional stresses, in which it is weak.

Although, we have chosen ¼ inch plate glass, ¼ inch fibreboard and 16 gauge sheet iron, united in the manner described, for the purposes of illustrating our invention, the invention may be employed with any desired thickness of sheet glass, spacing sheet and backing plate, in accordance with the conditions desired. The spacing sheet may be omitted; but if this is done a heavier backing plate would have to be employed, thus increasing materially the weight of the construction.

By using the spacing sheet, the neutral axis of the beam is placed farther away from the normal neutral axis of the sheet glass and nearer the normal neutral axis of the backing plate, thus lessening the tensional stresses in the glass, and allowing a thinner backing plate, to reduce weight. Furthermore, by using the proper thickness of spacing sheet, depending on the glass thickness, the neutral axis of the beam may be brought without the body of the glass, as in the construction described.

A decided advantage of the described construction is the fact that when the mirror is supported in upright position and a person or object should happen to bump the mirror, or bear against it, there is no danger of the mirror breaking. Also, there is no danger of the mirror breaking, if it is set at an angle to the horizontal as is often done in effecting optical illusions.

In some cases, we have found that it is unnecessary to employ a backing plate over the entire surface of the mirror; and as illustrated in Figure 2, we may use spaced backing strips 8, of the character described, adhesively secured to the fibreboard, spacing sheet 9, which may extend either over the entire surface, as shown; or which may be merely separate strips coextensive with backing strips 8. This construction obviously is of lesser weight than that shown in Figure 1. The backing strips 8 may be so spaced to produce the most efficacious results, depending on the glass thickness and the thickness of the spacing sheet.

As illustrated in Figure 3, we have shown a method by which our mirror construction may be advantageously secured in place; and for the purposes of illustration we have chosen the modification of Figure 2. An aperture 11 is provided in the frame 12, the mirror construction being seated in groove 13 therein, and framing 14 being provided about the edges of the mirror. In the aperture 11 and secured in any suitable manner, such as by welding to the fixed angle irons 16, are a plurality of supports 17. These supports are each preferably rods, united by a turnbuckle 18 of conventional construction. The ends of the supports, opposite to those secured to the angle irons, are secured, in any suitable manner, as by welding, to the metal backing plates 8.

By the described construction, the lengths of supports 17 may be so preadjusted by turnbuckles 18, as to regulate the stresses in the mirror construction, and thereby compensate for any deflection and consequent distortion which might exist. Furthermore, the supports 17 provide additional reinforcing means.

In Figure 4, is illustrated a modified arrangement, for supporting our mirror construction, in a wall 21; and for the purpose of illustration, we have chosen the modification of Figure 2. Secured, in any suitable manner, to the backing strips 8 adjacent the upper and lower edges of the mirror, is a metal truss 22. Supports 23, having turnbuckles 24, are secured to the truss and to the intermediate backing strips 8, in a manner described with respect to the construction of Figure 3. The turnbuckles 24 may be preadjusted to subject the mirror to the proper forces to insure against any deflection; and the entire construction may be removably positioned in the wall recess 26.

Although, in connection with Figures 3 and 4, we have described the mirror construction embodying the features of Figure 2, it is apparent that the construction of Figure 1, where the backing plate is coextensive with the surface of the mirror, may be equally employed.

We claim:

1. In a mirror construction, a backing plate of greater tensile strength than the mirror, and means integrally uniting said plate to the mirror.

2. In a mirror construction, a backing plate of greater tensile strength than the mirror, and means integrally uniting said plate to the mirror, including spaced means interposed between the backing plate and mirror.

3. In a mirror construction, a backing plate of sheet metal, and means integrally uniting said plate to the mirror, including a spacing sheet interposed between the sheet metal and the mirror.

4. In a mirror construction, a backing plate of greater tensile strength than the mirror, a spacing sheet adhesively secured to the backing plate, and a coating of adhesive securing the spacing sheet to the mirror.

5. In a mirror construction a plurality of backing strips of greater tensile strength than the mirror, means adhesively secured to the strips for spacing them from the mirror, and means adhesively securing the spacing means to the mirror.

6. In a mirror construction, a backing plate of greater tensile strength than the mirror, means adhesively securing said backing plate to the mirror, and a support secured to the backing plate and to a fixed element to reinforce the construction.

7. In a mirror construction, a backing plate of greater tensile strength than the mirror, means securing said backing plate to the mirror, and a support secured to the backing plate and to a fixed element to reinforce the construction, said support including a turn buckle for adjusting the length thereof.

8. In a mirror construction, a plurality of backing strips of greater tensile strength than the mirror, means securing the strips to the mirror, a plurality of supports secured to the strips and to a fixed element to reinforce the construction, said supports including turn buckles for adjusting the lengths thereof.

In testimony whereof, we have hereunto set our hands.

DAVID L. SHATTO.
FRANK FLOYD LINDSTAEDT.